(12) United States Patent
Heyworth

(10) Patent No.: US 7,545,518 B2
(45) Date of Patent: Jun. 9, 2009

(54) METHOD AND PROBE FOR DETERMINING DISPLACEMENT

(75) Inventor: Harold Heyworth, Loughborough (GB)

(73) Assignee: Rolls-Royce plc, London (GB)

( * ) Notice: Subject to any disclaimer, the term of this patent is extended or adjusted under 35 U.S.C. 154(b) by 349 days.

(21) Appl. No.: 11/454,982

(22) Filed: Jun. 19, 2006

(65) Prior Publication Data

US 2007/0001109 A1    Jan. 4, 2007

(30) Foreign Application Priority Data

Jun. 24, 2005   (GB)   ................................. 0513000.0

(51) Int. Cl.
*G01B 11/14* (2006.01)
(52) U.S. Cl. ..................................... 356/620
(58) Field of Classification Search .................. 356/620
See application file for complete search history.

(56) References Cited

U.S. PATENT DOCUMENTS

| | | | | |
|---|---|---|---|---|
| 4,103,155 A | * | 7/1978 | Clark | 250/231.13 |
| 4,879,555 A | * | 11/1989 | Ichikawa et al. | 341/13 |
| 5,214,278 A | * | 5/1993 | Banda | 250/231.14 |
| 5,253,531 A | * | 10/1993 | Walker et al. | 73/650 |
| 5,598,270 A | * | 1/1997 | Meisser et al. | 356/400 |
| 5,748,111 A | * | 5/1998 | Bates | 341/11 |
| 5,757,500 A | * | 5/1998 | Rueb | 356/620 |
| 5,900,930 A | * | 5/1999 | Simon et al. | 356/138 |
| 6,147,342 A | * | 11/2000 | Kucher | 250/231.13 |
| 6,731,392 B2 | * | 5/2004 | Kim et al. | 356/620 |
| 7,191,943 B2 | * | 3/2007 | Sewell et al. | 235/454 |
| 7,252,235 B2 | * | 8/2007 | Kucher et al. | 235/462.16 |
| 2003/0030820 A1 | * | 2/2003 | Kim et al. | 356/620 |

* cited by examiner

*Primary Examiner*—Roy Punnoose
(74) *Attorney, Agent, or Firm*—W. Warren Taltavull; Manelli Denison & Selter PLLC

(57) ABSTRACT

In order to determine displacement, axial and radial in a rotating component, an optical displacement probe is used incident upon a target formed from surface features in a rotating component surface. The surface features create a target which is axially variable in terms of reflectivity, but substantially consistent for the same circumferential band incident position. In such circumstances, differences in responses can be determined by a controller deducting time period ΔT differences between peaks 20, 21, 30, 31 in one axial position from the time period in a different axial position in order to provide an axial signal proportional to axial displacement. In terms of determining radial displacement, an angularly presented probe part in the form of an optical fiber 3 is used so that variation of the time period is proportional to radial as well as axial displacement. In such circumstances by deducting the axial displacement determined through compounding a perpendicularly presented probe it is possible to determine radial displacement. The targets created may comprise stripes, wedge or parallel bands of surface features which have reflectivity from background activity as determined by the probes for signal processing by a controller as described.

17 Claims, 6 Drawing Sheets

METHOD AND PROBE FOR DETERMINING DISPLACEMENT

FIELD OF THE INVENTION

Aspects of the present invention relates to a method and probe for determining displacement and in particular displacement of a shaft in order to provide clearance measurements in a gas turbine engine.

BACKGROUND OF THE INVENTION

It will be understood that it is important to accurately measure the clearance between various components in a machine such as a gas turbine engine. Previous non optical methods of achieving clearance measurement have utilised capacitance probes. This approach has difficulties with regard to access in that the necessary equipment is relatively large and it will be understood that there may be temperature limitations with regard to the construction of the capacitance probe. In addition, capacitance probes generally look end on to a part or onto an added part that may not always be available with regard to determining clearance measurements in a gas turbine engine.

With rotating components it is important to be able to note the axial as well as radial displacements for such situations as clearance measurement. It has been known to utilise optical devices for displacement measurement in terms of measuring the scatter of a reflected light beam dependent upon displacement between the emitter and the reflective surface, that is to say variations in displacement of that surface or chassis upon which the light emitting fibre or other conduit is placed. Unfortunately, previously such optical detectors have been limited in their ability to identify both axial and radial displacement.

SUMMARY OF THE INVENTION

In accordance with the present invention there is provided a displacement probe arrangement for a rotating element, the arrangement comprising a target and an optical probe, the arrangement characterised in that the target has circumferentially encoded surface features for application to a rotatable component in use and the optical probe comprises a light emitter and a light receiver to reflect light from the target, the surface features being selectively reflective to reflect variably dependent upon a light incident position, but circumferentially repeatable in the target as that target rotates in use such that any time period variability in reflectivity pattern over the target circumference is indicative of displacement due to alteration in the light incident position.

Generally, the displacement indicated is axial and/or radial.

Generally, the light emitter and light reflector are the same optical fibre.

Preferably, the rotationally encoded surface features comprise a first stripe and a second stripe angularly presented to each other. Normally the first stripe is longitudinal and the second stripe angular to one end of the first stripe. Alternatively, the rotationally encoded surface features comprise a wedge in the major axial direction when the target is secured to a rotating component. Further alternatively, the rotationally encoded surface features comprise parallel stripes. Normally the parallel stripes are of differing circumferential length.

Typically, the target is arranged to be specifically secured to a rotating component in use. Generally, the optical probe comprises a first optical fibre and a second optical fibre. Potentially, the probe comprises optical fibres angularly presented to each other. Alternatively, the probe comprises parallel and vernier type side by side presentation of optical fibres.

For indication of axial displacement, a controller is arranged to receive a repeat signal from the optical probe upon each revolution of the target such that axial displacement causes a shift in light incidence position and the controller therefore receives a modified repeat signal in the reflectivity pattern indicative of axial displacement.

Alternatively for axial displacement where the target comprises circumferential stripes, the optical probe provides a stripe signal as the reflectivity pattern to a controller indicative of the target whereby variation or change in the stripe signal is indicative of axial displacement of the incidence position.

For radial displacement where the probe comprises first and second optical fibres, the first optical fibre is determinant of axial displacement in accordance with the above and the second optical fibre is angularly presented to the target for indication of axial and radial displacement by reflective light incidence position to provide a composite signal to the controller whereby radial displacement is determined by the controller by deducting the axial signal from the composite signal to give a radial signal indicative of radial displacement.

Typically, an arrangement as claimed in any preceding claim wherein the rotationally encoded surface features are provided upon a circumferential surface or an end surface of a component subject to rotation.

Also in accordance with the present invention there is provided a method of determining displacement of a rotating element utilising an optical probe, the method comprising applying a surface feature as a target on a component which rotates in use positioning an optical probe such that the optical probe emits light to and receives light from the target at a light incidence position such that surface features of the target provide selectively reflective variability dependent upon light incidence position, but circumferentially consistent repeatable reflectivity about the same axial position for the circumference of the element.

Generally, in accordance with the method, axial displacement is determined by variations in the circumferentially consistent reflective signal received from the target. Normally, radial displacement is determined by initially determining axial displacement by variation in the circumferentially consistent signal and through angular presentation of a part of the optical probe determination of a composite signal dependent upon axial as well as radial displacement and deducting the axial displacement from the composite signal in order to determine radial displacement.

BRIEF DESCRIPTION OF THE DRAWINGS

Embodiments of aspects of the present invention will now be described by way of example only and with reference to the accompanying drawings in which:—

DETAIL DESCRIPTION OF THE INVENTION

As indicated above it is important that an optical displacement probe and a method of using that probe in an appropriate arrangement is such that it is convenient to use in terms of weight as well as space requirements. The present invention provides an optical displacement probe arrangement and method of operating that probe arrangement which can be secured upon rotating devices when positioned radially so saving the problem of trying to utilise an end of the rotating device which may be inaccessible. However, aspects of the invention can be adapted for end in use. Although described below principally with regard to a shaft utilised in a gas turbine engine, it will also be understood that the device can be utilised in order to monitor shaft movements in an automobile or for monitoring blade axial movements in a gas turbine engine for control purposes. Furthermore, rotation of discs or similar bodies can be monitored. It will also be understood that due to its simple nature and its use of a non contact approach and high temperature materials, that the present arrangement can be used in areas of high pollution, high temperature and small access space.

Figure 1:
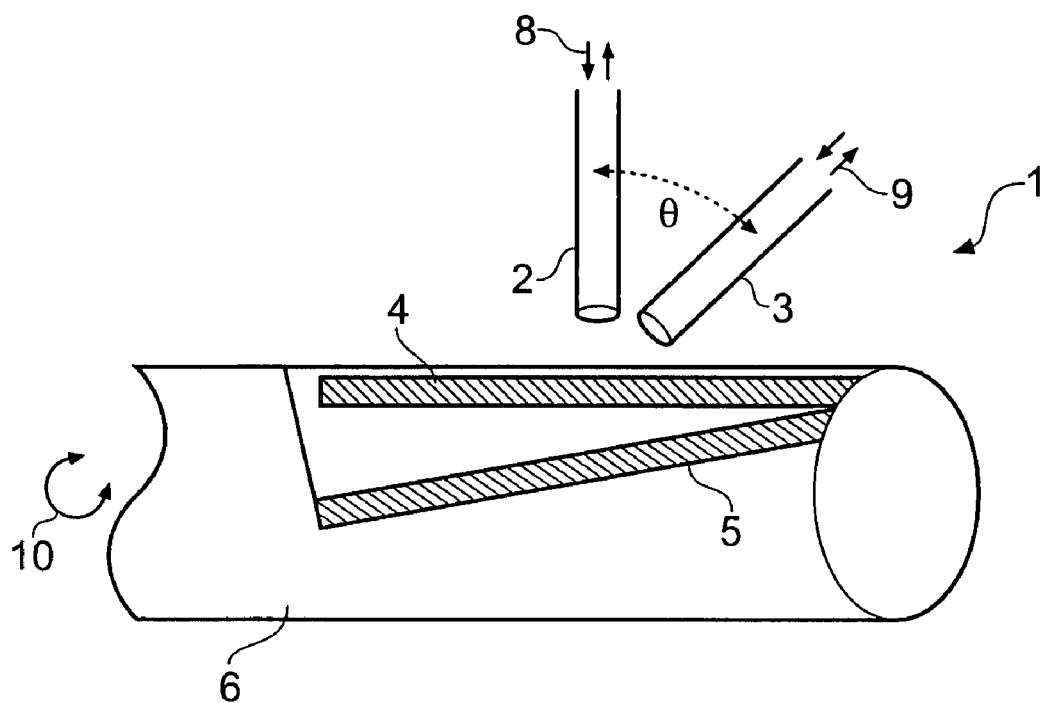
FIG. 1 is a schematic illustration of a first embodiment of an optical displacement probe arrangement in accordance with aspects of the present invention.
Figure 2:
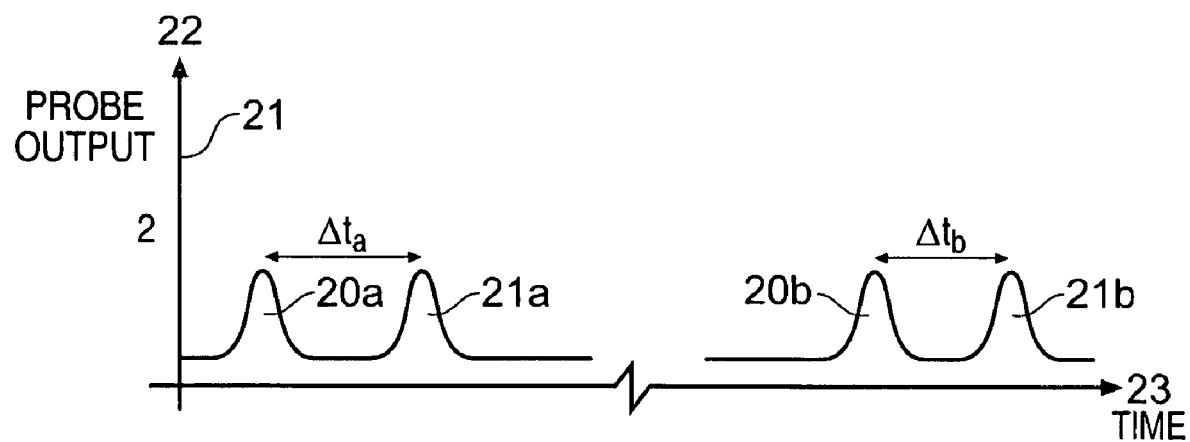
FIG. 2 is a graphic depiction of axial displacement signals in accordance with aspects of the present invention in order to determine axial displacement in a target upon a rotating component.
Figure 3:
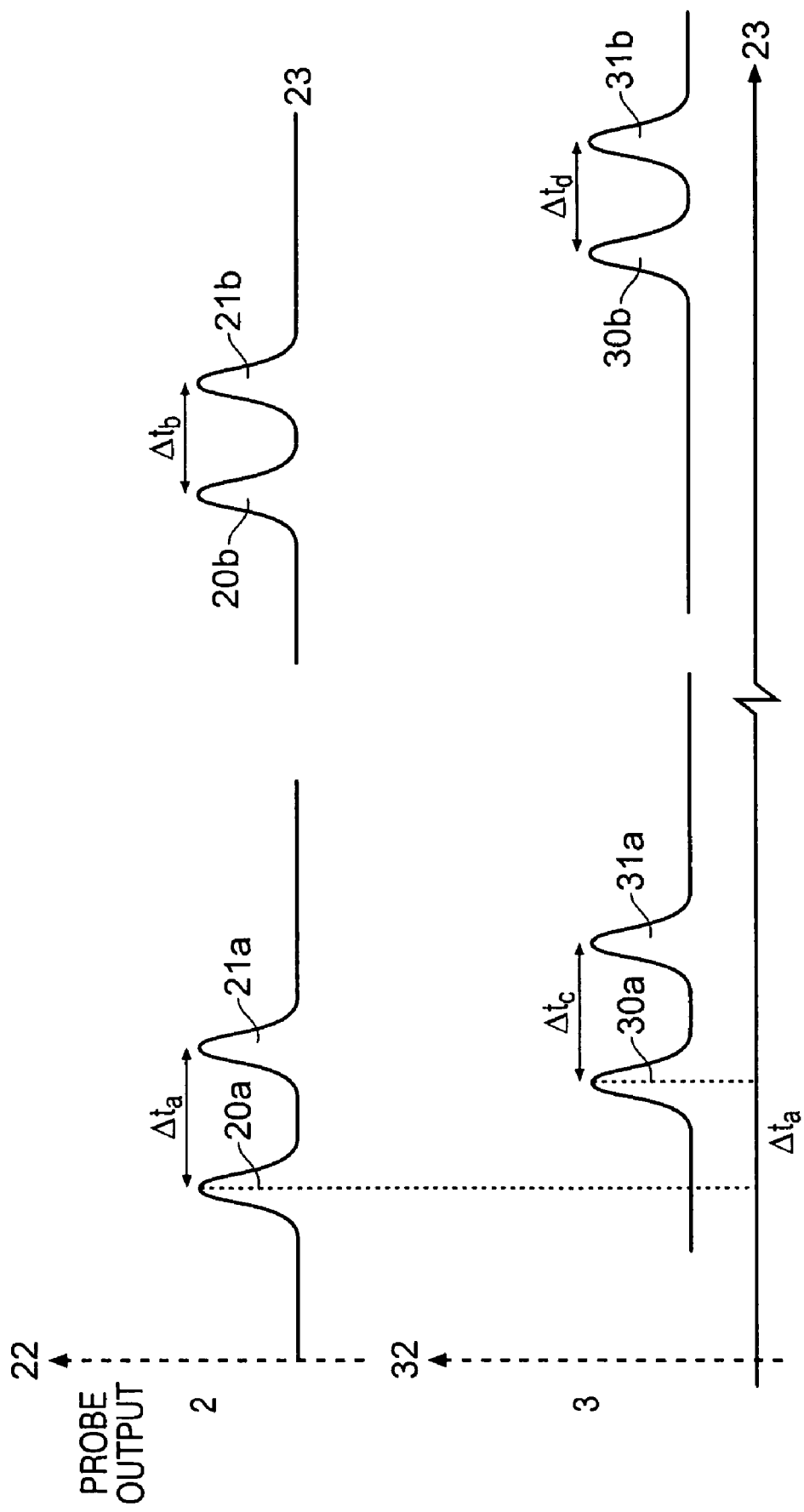
FIG. 3 is a graphic depiction of the output signals from respective parts of optical probes in accordance with aspects of the present invention in order to determine axial displacement, composite displacement and by deduction radial displacement of a target secured to a rotating component.

FIGS. 1 to 3 illustrate a first embodiment of an optical displacement probe in accordance with the present invention. In FIG. 1 a schematic depiction of an optical displacement probe arrangement 1 in accordance with the present invention is shown. Thus, an optical displacement probe comprises a first optical fibre 2 and a second optical fibre 3. The first optical fibre 2 is substantially perpendicular to a target formed from surface features 4, 5 upon a rotating component 6. There is an angle 7 between the fibres 2, 3 for reasons described later.

The fibres 2, 3 each emit and receive light in the direction of arrowheads 8, 9. The light is reflected from the surface of the rotating component 6 and in particular variability in the reflection pattern is provided by the surface features 4, 5 of a revolution of the component 6. In such circumstances, if the rotating component 6 rotates in the direction of arrowheads 10, it will be understood that the reflected light from the target formed by the surface of the component 6 and the features 4, 5 will be axially variable along the axial length of the component 6, whilst circumferentially consistent for the same light incident circumferential position based upon the target and component 6. These reflected light signals are depicted in FIGS. 2, 3 as a reflectivity pattern.

By providing an appropriate reflection pattern aspects of the present invention allow determination of radial and axial displacements. Generally, equation A below is utilised in order to determine values for radial and axial displacement. This determination depends upon initial determination of the change in time gap as measured by each probe 1, 2.

Change in Time gap=$(\Delta t_a - \Delta t_b)$ as measured at each probe 1, 2.

$$=(1/v)(\tan\theta \cdot \Delta r + \Delta x \cdot \tan\phi) \qquad \text{Equation A}$$

Where v=surface velocity
$\Delta r$=change in radial displacement
$\Delta x$=change in axial displacement
$\phi$=angle between stripes
$\theta$=angle between probes The simultaneous solution of equation A for each of the probes 1, 2 results in obtaining the values of $\Delta r$ and $\Delta x$, that is to say the radial and axial displacements.

It will be understood in accordance with aspects of the present invention that the configuration and orientation of the reflection pattern is important. In particular angular relationships between the stripes 4, 5 will to a significant extent determine the resolution ability of the arrangement.

A minimum value for $\phi$ (angle between stripes) can be found from using a minimum resolution of 0.1 mm axially and a surface velocity v of 400 m/s, values which are typical in practice. Using just the normal probe configuration gives a minimum inter-stripe angle $\phi$ of 11°.

A minimum angle for $\theta$ (angle between probes) can be therefore found using a typical radial displacement of 4 mm and an axial displacement of 10 mm, together with a typical minimum resolvable time period of 0.05 microseconds (using a 20 MHz detector). This gives a minimum intra-probe angle, $\theta$, of 27°.

Maximum angles of $\phi$ and $\theta$ are found similarly, and imposing a higher practical axial resolution of 0.05 mm then $\phi=63°$ and $\theta=78°$.

That is allowing greater intra stripe angles and/or intra probe angles will give greater axial and radial resolution. In practice large angles of $\theta$ are hard to fit into rotating machines and probes radially mounted (i.e. $\theta=0$) are preferred. However some freedom of angle is allowed and a reasonably practical angle would be 45°. The use of a faster detector also allows a narrower angle $\theta$ to be used.

FIG. 2 graphically depicts the output from the first optical fibre 2 described with regard to FIG. 1. It will be understood that the surface features 4, 5 will create peaks 20, 21 in the output signal of the fibre 2 as a reflectivity pattern. These peaks 20, 21 indicate greater reflection from the surface features 4, 5. The time period $\Delta T$ is indicative of the spacing between the features 4, 5. It should be noted if the fibre 2 retains position upon the same circumferential band position then the time period $\Delta T$ will remain consistent. However, as indicated above, the spacing between the features 4, 5 and therefore $\Delta T$ will vary if the circumferential light incident band position varies axially in use. In such circumstances, variations in $\Delta T$ will be indicative of axial movement in the component 6. It will be appreciated that axial movement may be to increase or decrease the spacing of the features 4, 5 and therefore $\Delta T$. In the graphic depiction shown in FIG. 2, it can be seen that the output signal 21 of the fibre 2 is substantially consistent for the features 4, 5, but there is a difference in $\Delta Ta$ between the peaks 21a, 20b and $\Delta Tb$ and the peaks 20a, 21b. This is indicative of axial movement as described above. Thus axial movement is proportional to delta Ta–$\Delta Tb$. It will be understood that this axial movement or displacement will occur over a time period 23 with repeated presentation of the peaks 20, 21 over that time period 23.

By the described method indicated above with regard to FIG. 2, axial displacement can be determined. However, normally a rotating component will also be subject to radial displacement, that is to say displacement relative to the axis of rotation. FIG. 3 illustrates a method utilising the optical displacement probe described with regard to FIG. 1 for determining radial displacement. In such circumstances as described above with regard to the first optical fibre, an output 22 is provided in terms of peaks 20, 21 with a time difference ΔT between the reflected response from the surface of the rotating component. The peaks 20, 21 being produced as a result of the surface features 4, 5 in a target. By such an approach as indicated above, axial movement over time 23 can be determined as a product of ΔTa–ΔTb. In order to determine radial movement or displacement, the second optical fibre 3 which is presented at an angle itself produces output 32 in the form of peaks 30, 31 with a time period ΔT between the peaks 30, 31. It will be noted that there is a time shift ΔTe from the peaks 20, 21 from the first probe 2. It will be understood as a result of the angular presentation of the second probe component in terms of optical fibre 3 that the reflective peaks 30, 31 are as a result of both axial as well as radial displacement of the target secured upon the rotating components 6. In such circumstances it will be understood that the shift in the time period ΔT, is as a result of both radial and axial displacement and will be shown by the peaks 30a, 31a in comparison with the peaks 30b, 31b. In such circumstances a composite signal is provided proportional to axial as well as radial movement as a result of the deduction of ΔTd from ΔTc. It is known from the deduction performed with regard to the first optical fibre 2 that axial movement is proportional to ΔTa–ΔTb so that radial movement is therefore proportional to the composite signal, that is to say ΔTc–ΔT with deduction of the axial displacement signal, that is to say ΔTa–ΔTb. In such circumstances, radial movement of the rotating component 6 can also be determined.

Figure 4:
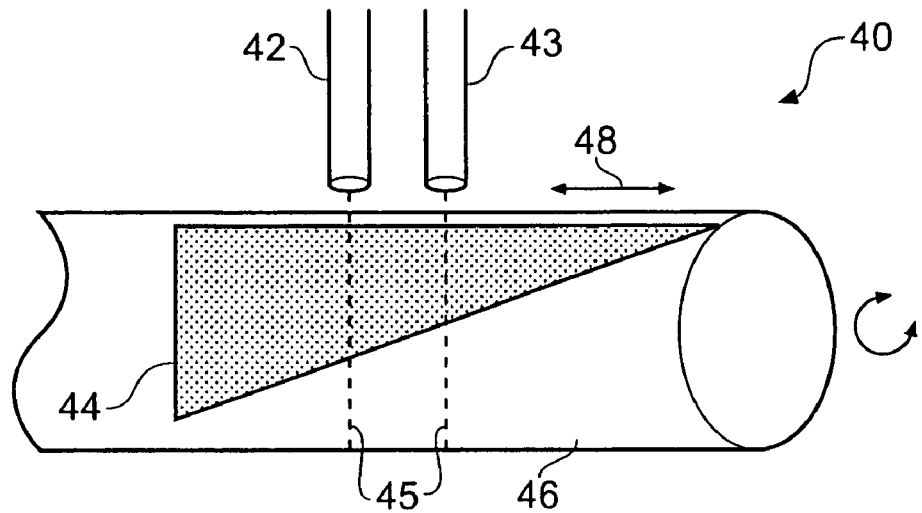
FIG. 4 is a schematic illustration of a second embodiment of an optical displacement probe in accordance with aspects of the present invention.

FIG. 4 illustrates a second embodiment of an optical displacement probe arrangement 40 in accordance with the present invention. Thus, an optical probe is again formed by a first optical fibre 42 and a second optical fibre 43 in a parallel and vernier type configuration. A surface feature 44 provides a target for light incident from the fibres 42, 43 and for reflection back into the fibres 42, 43 in order to create output signals in a reflectivity pattern. As previously, there is axial variation between the surface feature 44 as a target and therefore in the output response, but for the same circumferential band incidence position, notionally denoted by broken lines 45, there will be the same respective reflectivity pattern.

Figure 5:
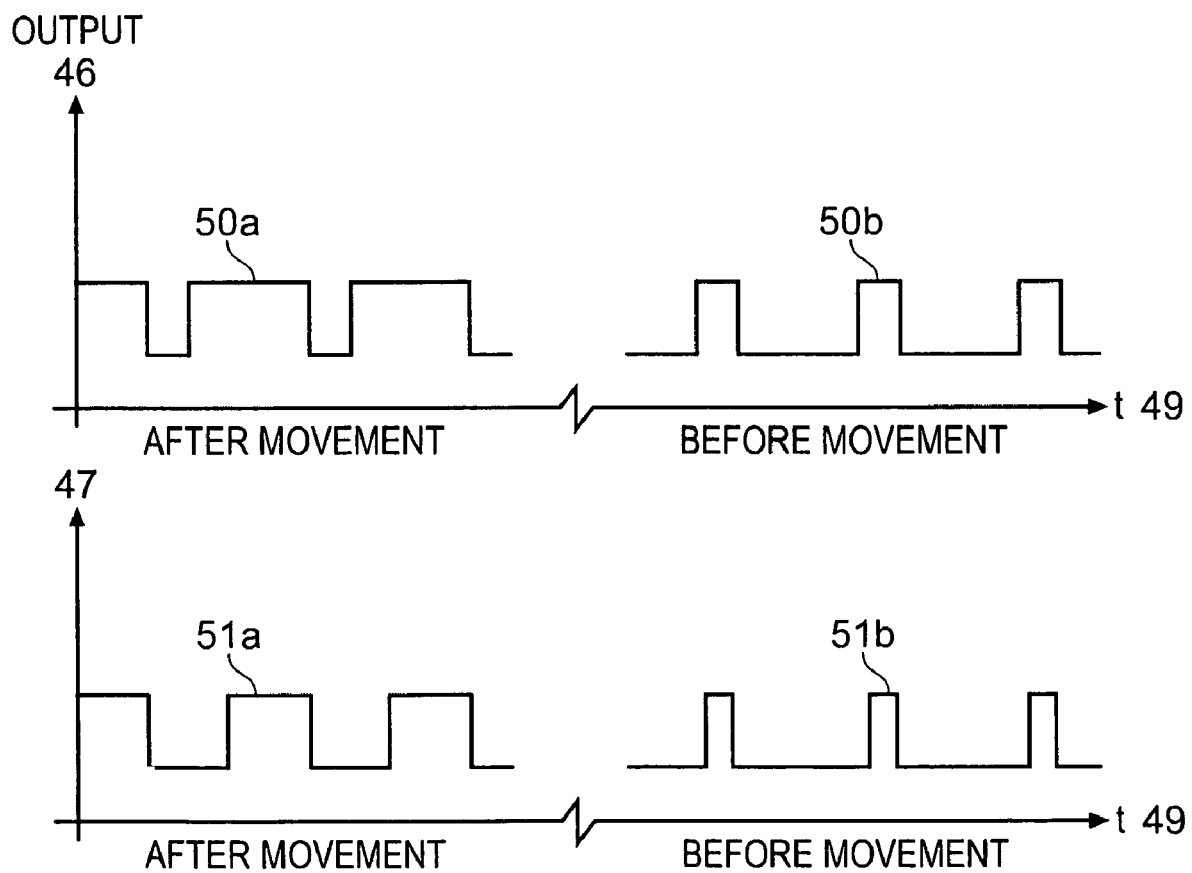
FIG. 5 is a graphic depiction of output signals from an optical probe as depicted in FIG. 4.

FIG. 5 graphically depicts output signals from the fibres 42, 43 depicted in FIG. 4. It can be seen as the surface feature 44 is substantially wedge shaped, the width in the circumferential incidence position 45 varies if there is axial displacement in the direction of arrowhead 48 (FIG. 4). This is reflected in the output signals 46, 47 from the respective fibres 42, 43. These signals against time 49 create the variations in the line 50, 51 from the respective fibres 42, 43 dependent upon incident circumferential position 45 on the rotating component 46. These variations are indicative of axial displacement and therefore can be utilised in order to monitor and quantify axial displacement.

Figure 6:
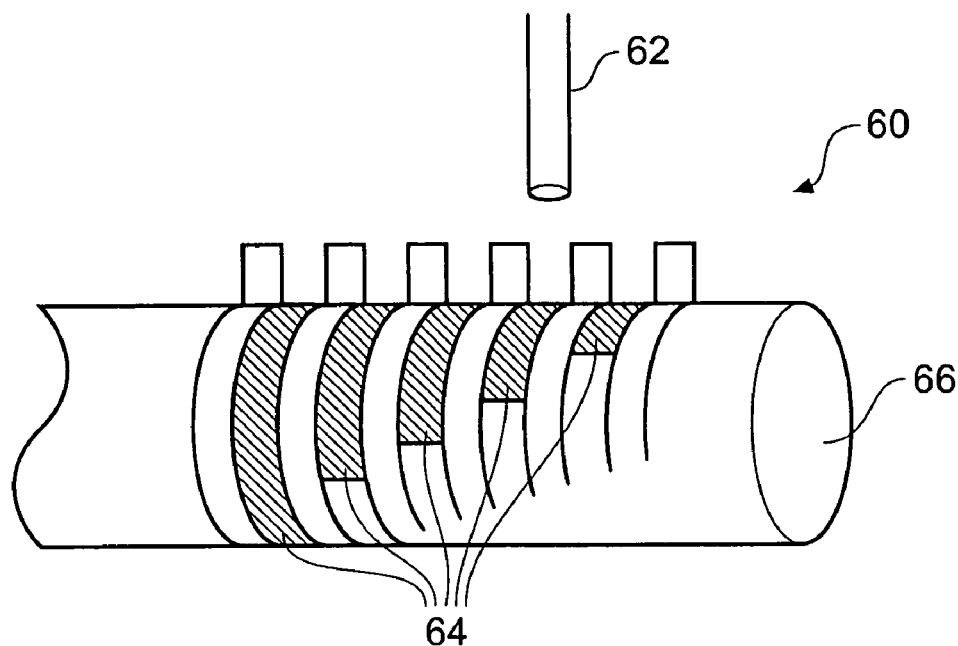
FIG. 6 is a schematic depiction of an optical displacement probe in accordance with a third embodiment of aspects of the present invention.
Figure 7:
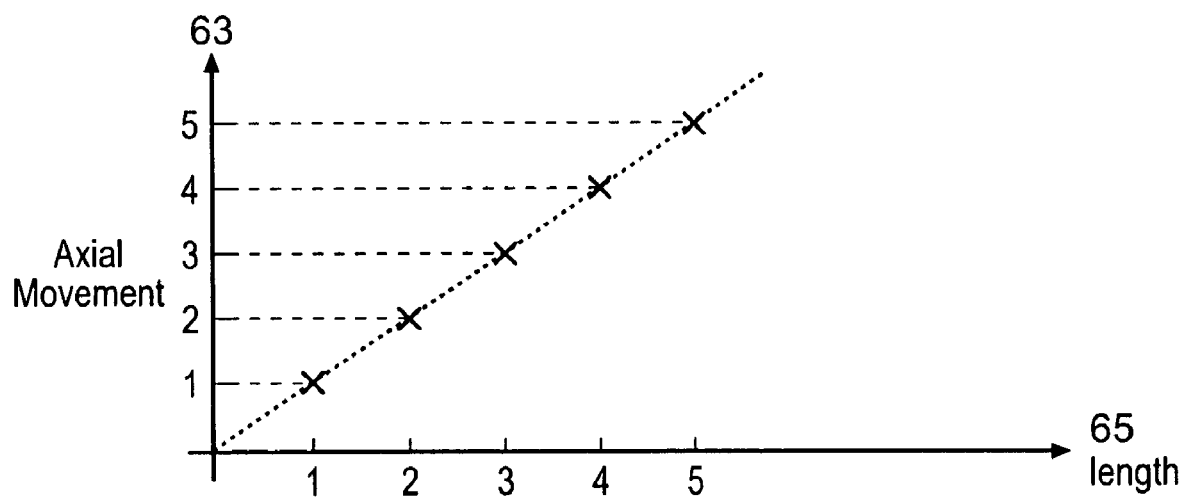
FIG. 7 is a graphic depiction of axial position against signal length indicative of axial displacement.

FIGS. 6 and 7 illustrate a third embodiment of an optical probe arrangement 60 utilised in accordance to one method of the present invention. Thus, a single fibre 62 optical probe is incident upon a target formed by surface features 64 on a rotating component 66. These surface features 64 comprise circumferential markings of varying lengths which correspond to different regulated axial positions along the length of the rotating component 66. Thus, as the single optical fibre 62 probe deviates axially relative to the surface feature 64, it will be understood that the reflective signal response varies in the reflectivity pattern provided.

FIG. 7 illustrates graphically the results of the reflected signals from the optical fibre 62. Thus, axial position 63 is depicted relative to the length of marking 65. In such circumstances, provided there is sufficient gap between the surface features 64, it will be understood that the optical fibre 62 as a probe will be able to distinguish between the features 64 and therefore incrementally indicate the axial position of the probe relative to the rotating component 62 and therefore deduce axial displacement of that component 66 in use. It will be understood that the incidence width of the optical fibre 62 incident light and reflective light should be sufficient that there is no overlap between adjacent features 64, otherwise spurious results may be provided.

It will be understood that aspects of the present invention provide an optical displacement probe which can comprise two optical fibres or conduits in the first two embodiments depicted respectively in FIGS. 1 to 3 and FIGS. 4 to 5 or a single optical fibre probe as depicted in FIGS. 6 to 7. Each optical fibre transmits light outward and receives reflected light from the surface of the rotating component. It will be understood that the surface features described above will generally enhance reflection in order to create peaks in the output signals from the optical fibres, but alternatively the surface features may dull reflection in order to create troughs in normally high reflectivity surfaces depending upon requirements. In either event, peak to peak time periods ΔT will be determined, and variations in that time period ΔT utilised in order to determine axial and where necessary radial displacement or movement of the rotating component.

Generally, the target is created by the surface features, and as indicated above is axial in extent such that there is variation in the response dependent upon incident position, but for the same circumferential incident position there is reflective consistency. In such circumstances the target is circumferentially encoded axially to provide an indication of incidence position and therefore through variation, axial displacement and where angularly presented and through deduction, radial displacement.

The surface features as indicated above may enhance reflection or dull reflection. The surface features may comprise dimples, an appropriate paint or reflective beads secured to the rotating component to vary from the normal background reflectivity of the rotating component to provide an appropriate target which can be deduced in accordance with the method and arrangement described above.

Through the circumferential encoding of the rotating component, which will typically be a shaft or moving part, such as a disc, of an engine or device, it will be understood that determination of displacement can be achieved. As all that is required is painting or otherwise securing a target in the form of surface features upon the rotating component it will be understood that there is little space or other accommodation requirements with regard to the present arrangement and method, and all that is required is an appropriate means for robustly securing the optical fibres or other conduits for fixed positioning. Clearly, optical fibres are relatively small and therefore themselves will not create packaging problems. Furthermore, the optical fibres and other features may be secured within a protective sheet and with a gas permeable seal such that the present arrangement and method can be used in a pressurised environment. In short the present arrangement provides a relatively small sized displacement monitoring arrangement which can resist high temperatures and other harsh environments. The arrangement can also simultaneously measure axial and radial displacements.

The second and third embodiment described respectively with regard to FIGS. 4 to 5 and 6 to 7 are generally limited to determining only axial displacement. In the second embodiment essentially a vernier type arrangement is provided which can achieve better axial resolution by comparing the output signals from the optical fibres such that variations in the time period ΔT are more accurately determined as a result of the auto correction through error cancellation between the output signals from each probe.

The third embodiment depicted in FIGS. 6 and 7 again is limited to axial measurement and depends upon specific circumferential markings with gaps between each surface feature as a mark to allow a probe to determine incrementally the axial position of the probe relative to the rotating component and therefore any displacement of that component.

Figure 8:
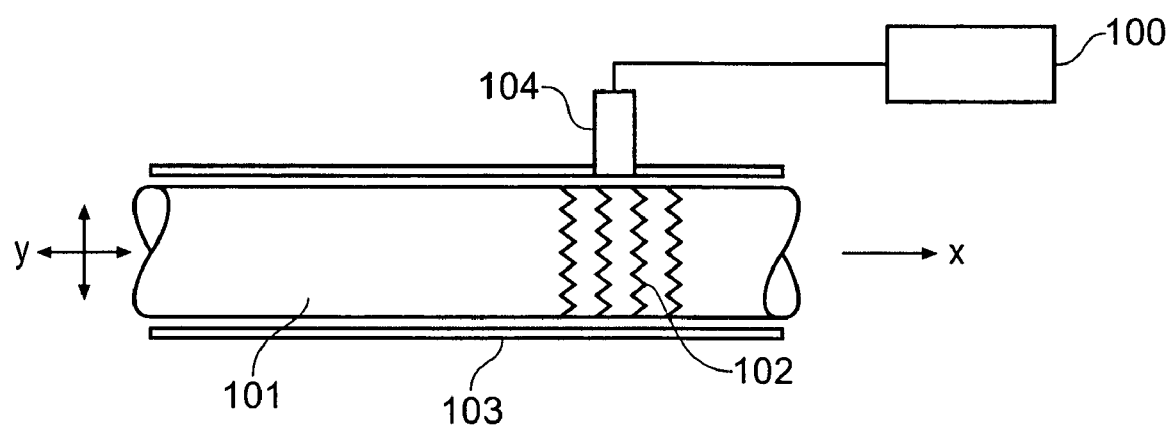
FIG. 8 is a schematic depiction of an optical displacement probe arrangement associated with a controller.

As indicated above, generally an optical probe arrangement in accordance with the present invention will be associated with a controller or similar device. This controller will monitor the pulses received from the optical probe in order to deduce peaks in the response profile reflectivity pattern and so determine time differences between those peaks. As indicated above, these time differences or ΔT are utilised in order to determine radial and/or circumferential deflection and displacement of a rotating component. Thus, referring to FIG. 8, providing a schematic depiction of a probe arrangement in accordance with the present invention is associated with a controller 100. A rotating component 101 includes a target 102 formed from surface features. The rotating component 101 rotates within a sleeve 103 incorporating an optical probe 104 in accordance with the present invention. The surface features of the target 102 as indicated previously are utilised in order to allow the probe 104 to determine variations in the time difference between distinctive peaks, or troughs, in the reflective response. The controller 100 monitors these peaks in order to determine variations and therefore displacement of the rotating component 101 in the direction of arrowhead X or in the direction of arrowhead Y dependent upon the regime used. It will be noted that the probe 104 is secured in the sleeve 103 and its position substantially fixed in order to monitor displacement as described.

Aspects of the present invention utilise a narrow band light source and filter mechanism in order to improve noise ratio. Additionally, the light source may be modulated in terms of time and amplitude to enable extraction of the output signals.

Generally, the optical fibres will be restricted to glass rods or to crystal rods and so no buffer/overcoat as a standard optical fibre will be required.

Beneficially, the optical fibres in the displacement probe can be shaped to improve light emission and/or collective properties. For example, curvatures may be provided in the end of the fibres in order to provide them with a lens function. One specific end would be in the shape of an axicon. Such an axicon shape gives the probe a longer stand off distance in terms of the effective ejection and collection of light reflected from the surface of the rotating component. Additionally, the probes may incorporate graded index ends, diffractive optical elements or any other device in order to improve ejection and collection of the light reflected from the target surface of the rotating component and in particular in order to distinguish across the target formed from the surface features.

In addition to use of visible light, it will also be understood that microwave, radio frequency and infra red light sources may be used provided appropriate means are provided for filtering a collection of the ejected and reflected light in terms of reflectivity.

In addition to the radial and axial displacement obtained the timing information obtained can (given sufficient detector bandwidth) be used for timing and frequency analysis of a rotor system. This could all occur simultaneously. This would for example be used on shafts, shrouded turbines or on blade tips. The functions of the angled stripes could also be carried out by (for example) the blade tips of a compressor blade given advantageous geometry.

It should be appreciated that the use of a known target, such as the surface feature 5 (FIG. 1) reduces the need for calibration of the probe.

Figure 9:
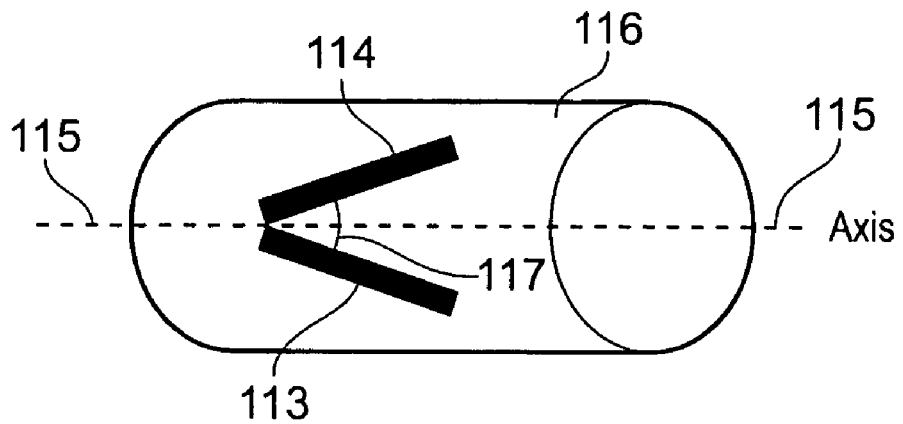
FIG. 9 is a schematic depiction of an alternative target configuration in accordance with aspects of the present invention; and, FIG. 10 is a schematic depiction of an end presentation of a target in accordance with aspects of the present invention.
Figure 10:
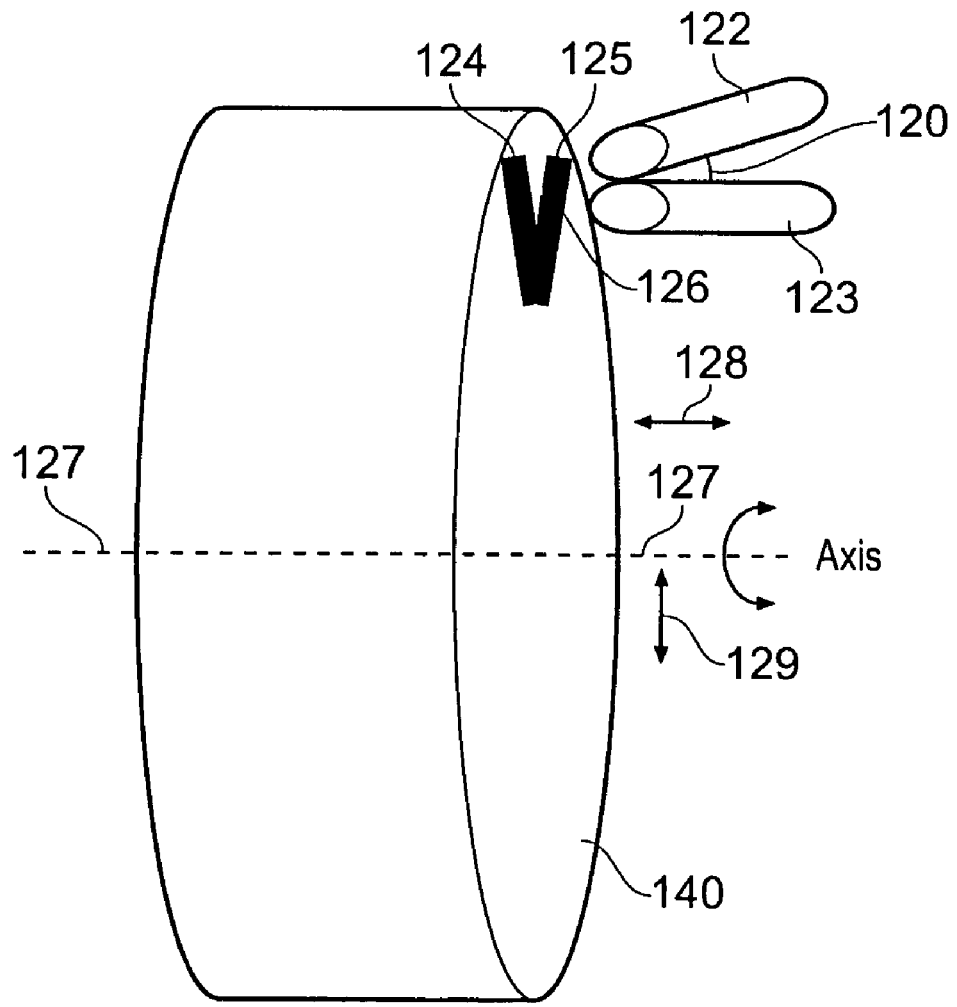

It will be understood that modifications and alterations to the above described embodiments of aspects of the present invention will be understood by those skilled in the art. Thus, for example, rather than having one probe normal and the other inclined at an angle feature relative to it, it is also possible to incline both probes to the normal or axis of rotation. Such an approach could lead to an advantage of minimising the angle of the probes which may make it practically easier to provide a viewing hole or port. Furthermore, with respect to the reflection stripes it is also not absolutely necessary for these stripes to run respectively axially and angled to each other. Thus, as depicted schematically in FIG. 9 stripes 113, 114 can be provided respectively angled to an axis of rotation 15 upon a rotating body 116. Thus, the angle 117 is defined by the stripes 113, 114. It will also be understood as schematically illustrated in FIG. 10 that a rotating body 140 may be arranged such that two probes 122, 123 with an angle 120 between them view stripes 124,125 with an angle 126 between them. Thus, the stripes 124, 125 are circumferentially rotationally encoded such that as the rotating body 140 in the form of a disc or shaft turns about an axis 127 the stripes 124, 125 provide responses to the probes 122, 123 with a time difference dependent upon displacement both axially in the direction of arrowheads 128 and radially in the direction of arrowheads 129. Thus, the circumferential rotational surface features are provided at an end when a radial view is not possible. The rotationally circumferentially encoded surface features may be located upon a peripheral circumferential surface of shaft or upon an end surface of a disc or shaft rotating about an axis.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A displacement probe arrangement for a rotatable component, the arrangement comprising:
   a target applied to said component, said target having surface features, and
   an optical probe being arranged to emit and receive signals having peaks relating to said surface features, wherein said optical probe comprises two optical fibers, said surface features being reflective dependent on the emitted signal incidence position such that, when the component is rotated, axial displacement is derived from a time delay between successive signal peaks from one of said optical fibers and radial displacement is derived from a time shift between a signal peak from one of said optical fibers relative to the signal peak from the other of said optical fibers.

2. An arrangement as claimed in claim 1 wherein the optical fibers are of a type that emit and reflect light.

3. An arrangement as claimed in claim 1 wherein the surface features comprise a first stripe and a second stripe angularly presented to each other.

4. An arrangement as claimed in claim 3 wherein the first stripe is longitudinal and the second stripe angular to one end of the first stripe.

5. An arrangement as claimed in claim 1 wherein the surface features comprise a wedge in the major axial direction when the target is secured to a rotating component.

6. An arrangement as claimed in claim 1 wherein the surface features comprise parallel stripes.

7. An arrangement as claimed in claim 6 wherein the parallel stripes are of differing circumferential length dependent upon axial position.

8. An arrangement as claimed in claim 6 wherein for axial displacement where the target comprises circumferential stripes, the optical probe provides a stripe signal as the reflectivity pattern to a controller indicative of the target whereby variation or change in the stripe signal is indicative of axial displacement of the incidence position.

9. An arrangement as claimed in claim 1 wherein the target is arranged to be specifically secured to a rotating component in use for reference with the optical probe position.

10. An arrangement as claimed in claim 1 wherein the optical fibers are angularly presented to each other.

11. An arrangement as claimed in claim 1 wherein for indication of axial displacement, a controller is arranged to receive a repeat signal from the optical probe upon each revolution of the target such that axial displacement causes a shift in the light incidence position and the controller therefore receives a modified repeat signal in the reflectivity pattern indicative of axial displacement.

12. An arrangement as claimed in claim 1 wherein for radial displacement where the probe comprises first and second optical fibers, the first optical fiber is determinant of axial displacement to provide an axial signal in a reflectivity pattern to a controller, wherein for indication of axial displacement, a controller is arranged to receive a repeat signal from the optical probe upon each revolution of the target such that axial displacement causes a shift in the light incidence position and said controller therefore receives a modified repeat signal in the reflectivity pattern indicative of axial displacement, and the second optical fiber is angularly presented to the target for indication of axial and radial displacement by reflective light incidence position to provide a composite signal in its reflectivity pattern to the controller whereby radial displacement is determined by the controller by deducting the axial signal from the composite signal to give a radial signal indicative of radial displacement.

13. An arrangement as claimed in claim 1 wherein the surface features are provided upon a circumferential surface or an end surface of a component subject to rotation.

14. A machine incorporating an arrangement as claimed in claim 1.

15. A machine as claimed in claim 14 wherein the machine is a gas turbine engine.

16. A method of determining displacement of a rotating component utilizing an optical probe comprising two optical fibers, the method comprising the steps of:
applying a surface feature as a target,
positioning said optical probe such that said optical probe emits light to and receives light from the target at a light incidence position such that the surface feature of the target provides reflective variability dependent upon the emitted signal incidence position such that, when the component is rotated, axial displacement is derived from a time delay between successive signal peaks from one of said optical fibers and radial displacement is derived from a time shift between a signal peak from one of said optical fibers relative to the signal peak from the other of said optical fibers.

17. A method as claimed in claim 16 wherein radial displacement is determined by initially determining axial displacement by variation in the circumferentially consistent signal and through angular presentation of a part of the optical probe determination of a composite signal dependent upon axial as well as radial displacement and deducting the axial displacement signal from the composite signal in order to determine radial displacement and provide a radial displacement signal.

* * * * *